June 1, 1965  
J. PETRI  
3,186,721  
DEFORMABLE PUMP SEAL FOR OPERATION UNDER EXTREME TEMPERATURE CONDITIONS  
Filed June 12, 1962  
2 Sheets-Sheet 1

INVENTOR:
JOHANNES PETRI

BY
Michael J. Striker
his ATTORNEY

INVENTOR:
JOHANNES PETRI
BY
Michael S. Striker
his ATTORNEY

United States Patent Office 3,186,721
Patented June 1, 1965

3,186,721
DEFORMABLE PUMP SEAL FOR OPERATION UNDER EXTREME TEMPERATURE CONDITIONS
Johannes Petri, Frankenthal, Pfalz, Germany, assignor to Klein, Schanzlin & Becker A.G., Frankenthal, Pfalz, Germany
Filed June 12, 1962, Ser. No. 201,860
Claims priority, application Germany, Aug. 2, 1961, K 44,404
13 Claims. (Cl. 277—16)

The present invention relates to pumps in general, and more particularly to a rotary pump which is especially suited for use in connection with hot fluids or with fluids whose temperature is likely to change within a rather wide range.

An important object of the invention is to provide a rotary pump which is constructed and assembled in such a way that any expansion or contraction of its parts in response to changes in temperature of the fluid cannot affect the action of seals which are provided to prevent leakage of the fluid.

Another object of the invention is to provide a rotary pump of the above outlined characteristics wherein any expansion or contraction of the pump housing cannot affect the sealing action of the means which prevents leakage of fluid around that portion of the rotary pump shaft which projects from the housing.

An additional object of the invention is to provide a rotary pump wherein any changes in temperature of conveyed fluid do not affect or affect only insignificantly the action of sealing means which prevents escape of fluid from the pump housing.

A further object of the invention is to provide an improved sealing structure for the shaft of a rotary pump.

A concomitant object of the invention is to provide an improved supporting structure for the housing and for the shaft bearings and seals of a rotary pump.

With the above objects in view, the invention resides in the provision of a rotary pump, particularly for use in connection with fluids whose temperature varies within a comparatively wide range, which comprises a supporting means, housing means mounted in the supporting means and having apertured wall means, a shaft mounted in the housing means and comprising a portion extending through and beyond the apertured wall means, and sealing means for preventing escape of fluid through the apertured wall means. This sealing means comprises a fixed sealing element which is spaced from the wall means and which sealingly surrounds the shaft portion, an axially expandible tubular sealing portion which surrounds the shaft portion and one end of which is sealingly secured to the wall means, and connecting means providing a sealing connection between the fixed sealing element and the other end of the tubular sealing portion so that the housing means may change its dimensions axially and/or radially in response to temperature changes of the fluid to thereby expand or to permit contraction of the tubular sealing portion without affecting the sealing action between the fixed sealing element and the shaft portion.

In accordance with a feature of my invention, the connecting means preferably constitutes a second supporting means which mounts the fixed sealing element, and the tubular sealing portion preferably assumes the form of one or more bellows which may define one or more fluid-containing compartments to prevent excessive heating or cooling of the fixed sealing element.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
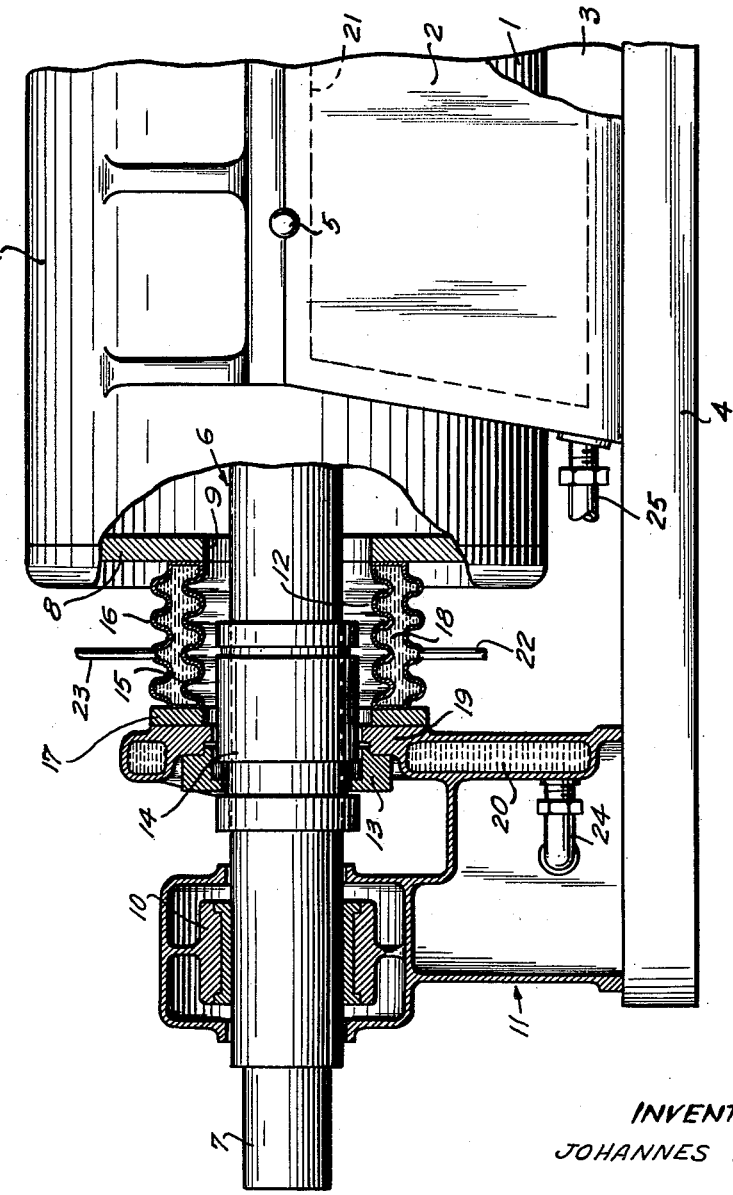
FIG. 1 is a partly elevational and partly sectional view of a rotary pump which embodies one form of my invention and wherein the sealing means comprises an inner bellows and an outer bellows.

Referring now in greater detail to the illustrated embodiments, and first to FIG. 1, there is shown a rotary pump which comprises a housing 1 mounted in a supporting means including two spaced brackets 2, 3 provided on a base plate 4 and supporting coaxial pivot pins 5 (only one shown) whose axes are perpendicular to the axis of the housing 1. This housing is pivotally supported by the pins 5 so that it may turn about these pins in a clockwise or anticlockwise direction, as viewed in FIG. 1. In addition, the pins 5 permit radial expansion or contraction of the housing so that the latter may expand or contract axially as well as radially in response to changes in temperature of the fluid (e.g., hot water) which is contained in the interior of the housing. A pump shaft 6 is rotatably mounted in the housing 1 and comprises a portion 7 which extends through and beyond a coaxial aperture 9 provided in the left-hand end wall 8 of the housing. The housing 1 may be lifted off the brackets 2 and 3.

A bearing 10 which is mounted in a second supporting means 11 rotatably supports the shaft portion 7 at a point spaced from the wall 8. The exact construction of the bearing 10 forms no part of this invention. The second supporting means 11 assumes the form of a bearing bracket which is mounted on the base plate 4 and which carries a fixed sealing element or gland 13. The element 13 sealingly engages the left-hand end face of a sleeve 14 provided on and rotating with the shaft portion 7. A deformable sealing portion in the form of two concentric tubular bellows 15, 16 is disposed between the fixed sealing element 13 and the wall 8. The right-hand end portions of the bellows 15, 16 are sealingly secured to the outer side of the wall 8, for example, by welding, by means of bolts or in any other suitable way. The two bellows surround the shaft portion 7 and their left-hand end portions are sealingly secured to a ring 17 which can form an integral part of or which may be detachably secured to an annular element 19 forming part of the supporting means 11. This annular element surrounds the shaft portion 7 and sealingly supports the aforementioned fixed sealing element 13. It will be noted that the second supporting means 11, and more particularly the annular element 19 and the ring 17 of this supporting means, constitute a connecting means which provides a sealing connection between the fixed sealing element 13 and the left-hand end portions of the bellows 15, 16 so that any expansion or contraction of the housing 1 in response to temperature changes of the fluid contained in this housing cannot affect the sealing action between the fixed sealing element 13 and the sleeve 14 on the shaft portion 7. The bellows 15, 16 are expandable and contractible in the axial direction of the shaft portion 7. The fixed element 13, the bellows 15, 16 and the second supporting means 11 together constitute a composite sealing means which prevents leakage of fluid through the apertured wall 8 and which is not affected by axial and/or radial expansion or contraction of the pump housing.

The two bellows 15, 16 form a cooling jacket which defines a heating or cooling fluid-containing compartment 18. If desired, the fluid filling the compartment 18 may be recirculated by means of a suitable pump or the like in order to heat or to cool the fluid contained in the space 12 defined by the periphery of the shaft portion 7 and the inner bellows 15. Such recirculating means is indicated in FIG. 1 by an inlet conduit 22 and an outlet conduit 23. The fluid recirculated in the compartment 18 insures that the fluid contained in the left-hand zone of the space 12 cannot appreciably change the temperature of the sleeve 14, of the annular element 19, of the ring 17 or of the fixed sealing element 13 whereby the sealing action of the element 13 upon the end face of the sleeve 14 remains unchanged. Owing to the fact that the fixed sealing element 13 is neither directly nor indirectly secured to the wall 8, any expansion or contraction of the housing 1 (including the wall 8) cannot affect the sealing action between the element 13 and the sleeve 14. It is preferred to utilize an inner bellows 15 which is closely adjacent to the shaft portion 7 so that the volume of the space 12 is small. This means that fluid contained in the compartment 18 can rapidly affect the temperature of fluid contained in the space 12, particularly if the fluid in the compartment 18 is circulated.

Figure 2:
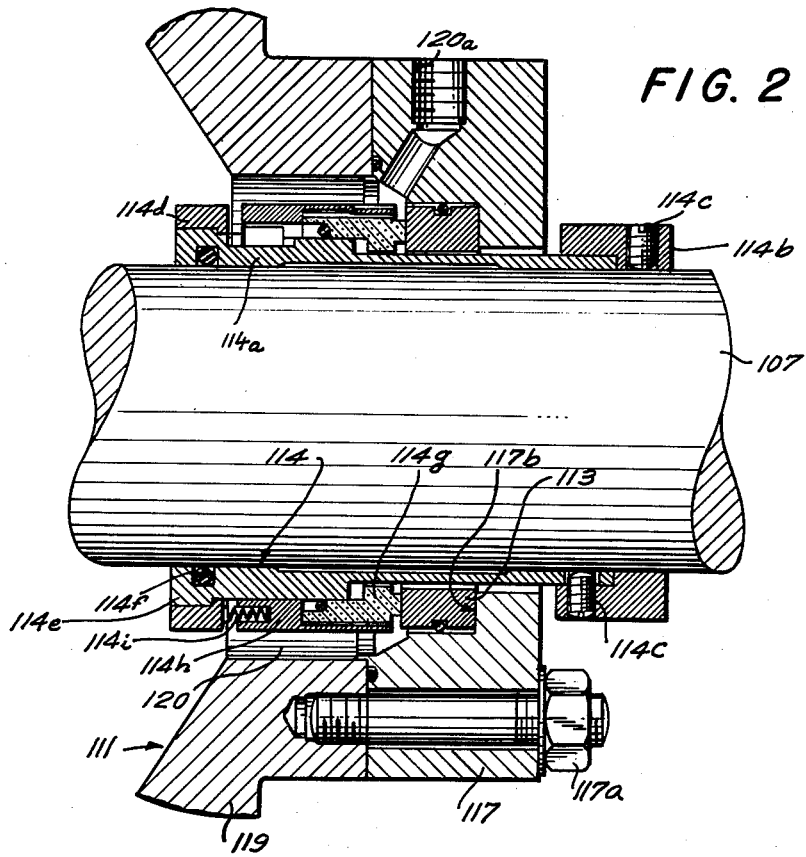
FIG. 2 is an enlarged axial section through a portion of a slightly different sealing means which may be utilized in the pump shown in FIG. 1.

The fixed sealing element 13 and the sleeve 14 form between themselves a so-called end face seal which is a mechanical seal of the type similar to a seal shown in greater detail in FIG. 2.

It will be noted that the annular element 19 of the second supporting means 11 surrounds the shaft portion 7 and the fixed sealing element 13. This annular element is provided with an annular fluid-containing chamber 20, and the fluid contained in this chamber is preferably caused to circulate to and from a suitable heating or cooling device by a recirculating means including a piping 24. This fluid maintains the temperature of the fixed sealing element 13 and of the sleeve 14 at a substantially constant value in order to make sure that the sealing action of the element 13 upon the sleeve 14 remains unchanged. Additional fluid-containing chambers are provided in the brackets 2 and 3. Only the chamber 21 in the bracket 2 is shown in FIG. 1. The means for recirculating a fluid in the chambers of the brackets 2 and 3 comprises a series of pipes one of which is shown in FIG. 1 at 25. The exact construction of the three recirculating means including the conduits 22, 23 and the pipes 24, 25 forms no part of this invention. For, example, all three recirculating means may be connected to a single pumping device so that the fluid withdrawn from the compartment 18 and from the chambers 20, 21 is caused to pass through a heating or cooling device before it is permitted to reenter the apparatus of FIG. 1. Suitable regulating means may be provided in the conduits 22, 23 and in the pipes 24, 25 to control the rate of recirculation.

FIG. 2 shows a slightly modified sealing means for a shaft portion 107. This shaft portion carries a composite sleeve 114 including a main tubular section or shaft sleeve 114a, a fixation ring 114b which is secured to the righthand end of the tubular section 114a and to the shaft portion 107, by grub screws 114c, and an abutment ring 114d which engages a collar 114e provided at the other end of the section 114a. The section 114a is provided with an internal groove for an O ring 114f.

The annular element 119 of the supporting means 111 is connected with a ring 117 by means of bolts 117a. The fixed sealing element 113 is in sealing abutment with an internal shoulder 117b of the ring 117. This element 113 preferably consists of rustproof steel and is in face-to-face sealing abutment with a rotating carbon ring 114g which rotates with and which is sealingly secured to the section 114a so that the annular gap between the ring 117 and the periphery of the section 114a is always sealed from the internal chamber 120 defined by the annular element 119. The port through which a heating or cooling fluid may be circulated through the chamber 120 is indicated at 120a. The rotating ring 114g is engaged by a retainer 114h which is biased by springs 114i so as to maintain the fixed sealing element 113 in sealing abutment with the shoulder 117b and with the right-hand end face of the rotating ring 114g.

Figure 3:
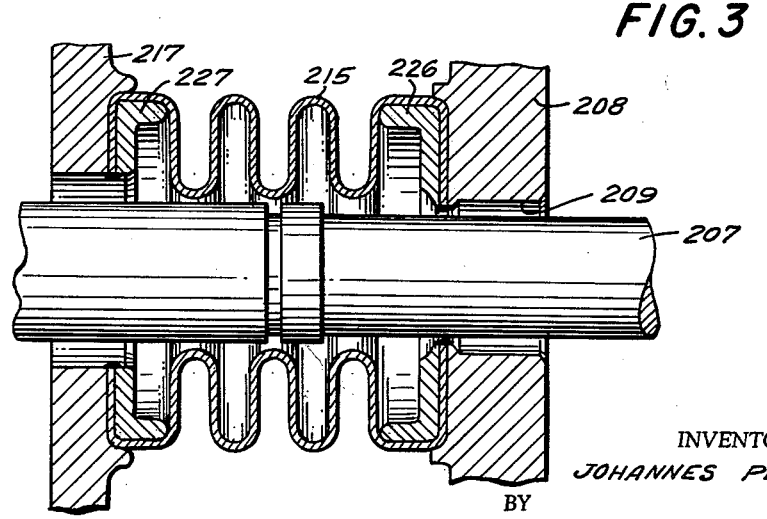
FIG. 3 is a fragmentary axial section through a modified pump wherein the sealing means comprises a single bellows.

The ring 117 and one or more bellows (not shown) may be conected with each other in a manner analogous to that shown in FIG. 3 which illustrates a portion of a different rotary pump wherein the shaft portion 207 is surrounded by a tubular sealing portion which comprises a single bellows 215. One end portion of this bellows is clamped between the outer side of a wall 208 which forms part of the pump housing and a clamping ring 226, and the other end portion of this bellows is clamped between a ring 217 and a clamping ring 227. The ring 217 corresponds to the ring 17 of FIG. 1 or to the ring 117 of FIG. 2, and the wall 208 is provided with an aperture 209 through which the shaft portion 207 extends. If desired, the outer side of the bellows 215 may be heated or cooled by sprays of water or by blasts of compressed air.

The clamping rings 226, 227 are held in position by suitable bolts and nuts or the like, not shown.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a rotary pump, particularly for use in connection with fluids whose temperatures varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion surrounding said shaft portion and having a first end sealingly connected with said wall means and a second end, and connecting means providing a sealing connection between the second end of said tubular sealing portion and said fixed sealing element so that said housing means may change its dimensions in response to temperature changes of the fluid to expand or to permit contraction of said tubular sealing portion without affecting the sealing action between said fixed sealing element and said shaft portion.

2. In a rotary pump, particularly for use in connection with fluids whose temperature varies within a comparatively wide range, in combination, housing means comprising apertured wall means movable in response to temperature changes; a shaft in said housing means, said shaft having a fixed axis and comprising a portion which extends through and beyond said apertured wall means; fixed pivot means mounting said housing means so that the latter is pivotable relative to said shaft about an axis perpendicular to the axis of said shaft; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion surrounding said shaft portion and having a first end sealingly connected with said wall means and a second end, and connecting means providing a sealing connection between the second end of said tubular sealing portion and said fixed sealing element so that said housing means may change its dimensions in response to temperature changes of the fluid to expand or to permit contraction of said tubular sealing portion without affecting the sealing action between said fixed sealing element and said shaft portion.

3. In a rotary pump, particularly for use in connection with fluids whose temperature varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion including at least one bellows surrounding said shaft portion and having a first end sealingly connected with said wall means and a second end, and connecting means providing a sealing connection between the second end of said bellows and said fixed sealing element so that said housing means may change its dimensions in response to temperature changes of the fluid to expand or to permit contraction of said bellows without affecting the sealing action between said fixed sealing element and said shaft portion.

4. In a rotary pump, particularly for use in connection with fluids whose temperature varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion comprising a plurality of bellows including an inner bellows and an outer bellows, said bellows surrounding said shaft portion and each thereof having a first end sealingly connected with said wall means and a second end, and connecting means providing a sealing connection between the second ends of said bellows and said fixed sealing element so that said housing means may change its dimensions in response to temperature changes of the fluid to expand or to permit contraction of said bellows without affecting the sealing action between said fixed sealing element and said shaft portion.

5. A combination as set forth in claim 4, wherein said bellows define between themselves a fluid-containing compartment which surrounds said shaft portion.

6. A combination as set forth in claim 5, further comprising means for recirculating the fluid contained in said compartment.

7. In a rotary pump, particularly for use in connection with fluids whose temperature varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion including at least one bellows surrounding said shaft portion and having a first end sealingly connected with said wall means and a second end, and connecting means providing a sealing connection between the second end of said bellows and said fixed sealing element so that said housing means may change its dimensions in response to temperature changes of the fluid to expand or to permit contraction of said bellows without affecting the sealing action between said fixed sealing element and said shaft portion, said bellows being closely adjacent to said shaft portion.

8. In a rotary pump, particularly for use in connection with fluids whose temperature varies within a comparatively wide range, in combination, supporting means defining fluid-containing chamber means; housing means mounted in said supporting means and comprising apertured wall means, said wall means being movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion surrounding said shaft portion and having a first end sealingly connected with said wall means and a second end, and connecting means providing a sealing connection between the second end of said tubular sealing portion and said fixed sealing element so that said housing means may change its dimensions in response to temperature changes of the fluid to expand or to permit contraction of said tubular sealing portion without affecting the sealing action between said fixed sealing element and said shaft portion.

9. In a rotary pump, particularly for use in connection with fluids whose temperature varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and sealingly engaging said shaft portion, an axially expandible tubular sealing portion surrounding said shaft portion and having a first end sealingly connected with said wall means and a second end, and connecting means providing a sealing connection between the second end of said tubular sealing portion and said fixed sealing element so that said housing means may change its dimensions in response to temperature changes of the fluid to expand or to permit contraction of said tubular sealing portion without affecting the sealing action between said fixed sealing element and said shaft portion, said connecting means defining at least one fluid-containing chamber.

10. A combination as set forth in claim 9, further comprising means for recirculating the fluid contained in said chamber.

11. In a rotary pump, particularly for use in connection with fluids whose temperature varies within a comparatively wide range, in combination, housing means having apertured wall means movable in response to temperature changes; a shaft in said housing means, said shaft having a portion extending through and beyond said apertured wall means; a fixed annular element surrounding said shaft portion; a fixed sealing element sealingly secured to said annular element, said fixed element surrounding and sealingly engaging said shaft portion; and a deformable tubular sealing portion surrounding said shaft portion and having ends sealingly secured to one of said elements and to said wall means so that said housing means may change its dimensions in response to temperature changes of the fluid without affecting the sealing action between said fixed element and said shaft portion.

12. In a rotary pump, particularly for use in connection with fluids whose temperature varies within a comparatively wide range, in combination, housing means comprising apertured wall means movable in response to temperature changes; a shaft in said housing means, said shaft comprising a portion which extends through and beyond said apertured wall means; and sealing means for preventing escape of fluid through said apertured wall means, said sealing means comprising a fixed sealing element spaced from said wall means, said fixed sealing element surrounding and forming a mechanical seal with said shaft portion, an axially expandible tubular sealing portion surrounding said shaft portion and having a first end sealingly connected with said wall means and a second end, and connecting means providing a sealing connection between the second end of said tubular sealing portion and said fixed sealing element so that said housing means may change its dimensions in response to temperature changes of the fluid to expand or to permit contraction of said tubular sealing portion without affecting the sealing action between said fixed sealing element and said shaft portion.

13. In a rotary pump, particularly for use in connection with fluids whose temperature varies within a comparatively wide range, in combination, first supporting means defining fluid containing internal chamber means; housing means mounted in said supporting means and having apertured wall means; a shaft in said housing means, said shaft having a portion extending through and beyond said apertured wall means; second supporting means defining fluid-containing internal chamber means and comprising a fixed annular element surrounding said shaft portion; a fixed sealing element sealingly secured to said annular element, said fixed element surrounding and sealingly engaging said shaft portion; and a deformable tubular sealing portion surrounding said shaft portion and having ends sealingly secured to one of said elements and to said wall means so that said housing means may change its dimensions in response to temperature changes of the fluid without affecting the sealing action between said fixed element and said shaft portion.

References Cited by the Examiner
UNITED STATES PATENTS

| 1,866,967 | 7/32 | Durham | 277—4 |
| 2,023,017 | 12/35 | Hough | 103—218 |
| 2,959,133 | 11/60 | Erwin | 277—15 |
| 3,104,620 | 9/63 | Lawrence | 103—218 |

EDWARD V. BENHAM, *Primary Examiner.*

SAMUEL ROTHBERG, *Examiner.*